US010068259B2

(12) United States Patent
Cai et al.

(10) Patent No.: US 10,068,259 B2
(45) Date of Patent: Sep. 4, 2018

(54) ELEVATOR MULTIMEDIA INFORMATION DISPLAY

(71) Applicant: International Business Machines Corporation, Armonk, NY (US)

(72) Inventors: Fang Cai, Shanghai (CN); Jing Ding, Shanghai (CN); Jing Li, Beijing (CN); Jian Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/291,354

(22) Filed: Oct. 12, 2016

(65) Prior Publication Data
US 2018/0101873 A1    Apr. 12, 2018

(51) Int. Cl.
| B66B 3/00 | (2006.01) |
| G06Q 30/02 | (2012.01) |
| G09G 5/00 | (2006.01) |
| G06F 3/147 | (2006.01) |

(52) U.S. Cl.
CPC .......... *G06Q 30/0269* (2013.01); *B66B 3/00* (2013.01); *B66B 3/008* (2013.01); *G06F 3/147* (2013.01); *G06Q 30/0251* (2013.01); *G06Q 30/0261* (2013.01); *G09G 5/003* (2013.01); *G09G 2320/08* (2013.01); *G09G 2320/10* (2013.01); *G09G 2354/00* (2013.01)

(58) Field of Classification Search
None
See application file for complete search history.

(56) References Cited

U.S. PATENT DOCUMENTS

| 6,073,727 A | 6/2000 | Difranza et al. | |
| 6,341,668 B1* | 1/2002 | Fayette | ............... B66B 3/008 |
| | | | 187/247 |
| 7,711,565 B1 | 5/2010 | Gazdzinski | |
| 2010/0332305 A1* | 12/2010 | Higgins | ............... G06Q 30/02 |
| | | | 705/14.16 |

FOREIGN PATENT DOCUMENTS

CN         105355158         2/2016

* cited by examiner

*Primary Examiner* — Joni Richer
(74) *Attorney, Agent, or Firm* — Fleit Gibbons Gutman Bongini Bianco PL; Donna Flores (57) ABSTRACT

Example embodiments of the present disclosure provide methods, a computer system and a computer program product for multimedia information display in an elevator. According to an embodiment of the method, moving status information of an elevator is obtained. The moving status information comprises at least a source floor information indicating where a passenger enters the elevator and a target floor information indicating where the elevator is moving. The multimedia information to be displayed is determined based on the moving status information of the elevator and the determined multimedia information is displayed in the elevator.

20 Claims, 4 Drawing Sheets

| Building ID | Floor ID | Business | Ad. Tag |
|---|---|---|---|
| B001 | F001 | | |
| B001 | F002 | Nail Salon | Woman, Fashion |
| B001 | F002 | Golf Equipment | Sports, Golf |
| B001 | ...... | ...... | ...... |
| B001 | F025 | Kid's school | Children, Education |

FIG. 4

| AD ID | Time (Length) | Ad. Tag |
|---|---|---|
| AD001 | 2 min. | Printer |
| AD002 | 1.5 min. | Woman, Fashion |
| AD003 | 20 seconds | Sports, Golf |
| ...... | ...... | ...... |
| AD099 | 15 seconds | Children, Education |

FIG. 5

ELEVATOR MULTIMEDIA INFORMATION DISPLAY

BACKGROUND

The present invention generally relates to information processing, and more specifically, to multimedia information display in an elevator.

Elevator multimedia, especially elevator advertising has become more and more popular and probably the most effective advertising or information display measures available in terms of consumer awareness, simply because elevator occupants are captive audiences surrounded by few distractions. Many buildings, especially office buildings, commercial buildings and shopping malls with many occupants from various industries, have been equipped with screens in the elevators for advertising or other kinds of multimedia information display.

In accordance with an existing solution, the contents displayed in elevators is typically pre-determined and pre-loaded. For example, company A and B have paid for advertising in all elevators in a certain region within a certain time period. During the time period, passengers in all elevators will see advertisements of company A and B.

SUMMARY

The existing solutions for multimedia information display in elevators typically are in a "one-for-all" mode, thus have very little customization.

Example embodiments of the present invention provide methods, systems and computer program products for multimedia information display in an elevator.

In an aspect, a computer-implemented method for multimedia information display in an elevator is provided. The method comprises obtaining moving status information of the elevator. The moving status information comprises at least source floor information indicating where a passenger enters the elevator and target floor information indicating where the elevator is moving. The method also comprises determining the multimedia information to be displayed based on the moving status information of the elevator. The determined multimedia information is displayed in the elevator.

In another aspect, a computer system for multimedia information display in an elevator is provided. The system comprises one or more processors and a memory coupled to at least one of the processors. The system also comprises a set of computer program instructions stored in the memory and executed by at least one of the processors in order to perform following actions. The actions comprise obtaining moving status information of the elevator. The moving status information comprises at least source floor information indicating where a passenger enters the elevator and target floor information indicating where the elevator is moving. The actions further comprise determining the multimedia information to be displayed based on the moving status information of the elevator. The determined multimedia information is displayed in the elevator.

In yet another aspect, a computer program product for multimedia information display in an elevator is provided. The computer program product comprises a non-transitory computer readable storage medium. Further, program instructions are stored on the non-transitory computer readable storage medium, and the program instructions are capable of being executed by at least one processor, to cause the at least one processor to perform a method. The method comprises obtaining moving status information of the elevator. The moving status information comprises at least source floor information indicating where a passenger enters the elevator and target floor information indicating where the elevator is moving. The method also comprises determining the multimedia information to be displayed based on the moving status information of the elevator. The determined multimedia information is displayed in the elevator.

It is to be understood that the Summary is not intended to identify key or essential features of embodiments of the present invention, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present invention with reference to the accompanying drawings, the above and other objects, features and advantages of the present disclosure will become more apparent, wherein.

Throughout the drawings, the same or similar reference numerals represent the same or similar elements.

DETAILED DESCRIPTION

Principles of the present disclosure will now be described with reference to some example embodiments. It is to be understood that these embodiments are described only for the purpose of illustration and to help those skilled in the art to understand and implement the present disclosure, without suggesting any limitations as to the scope of the disclosure. The disclosure described herein can be implemented in various manners other than the ones described below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

As described above, currently solutions are on a 'one-for-all' basis and provide very little customization; therefore, there is a need in the art to enable elevator multimedia display in a more targeted way. Additionally, and/or alternatively, there is also a need in the art to enable elevator multimedia display to be able to change dynamically based on the running status of the elevators. The present invention is targeted to fulfill one or more needs discussed above.

Figure 1:
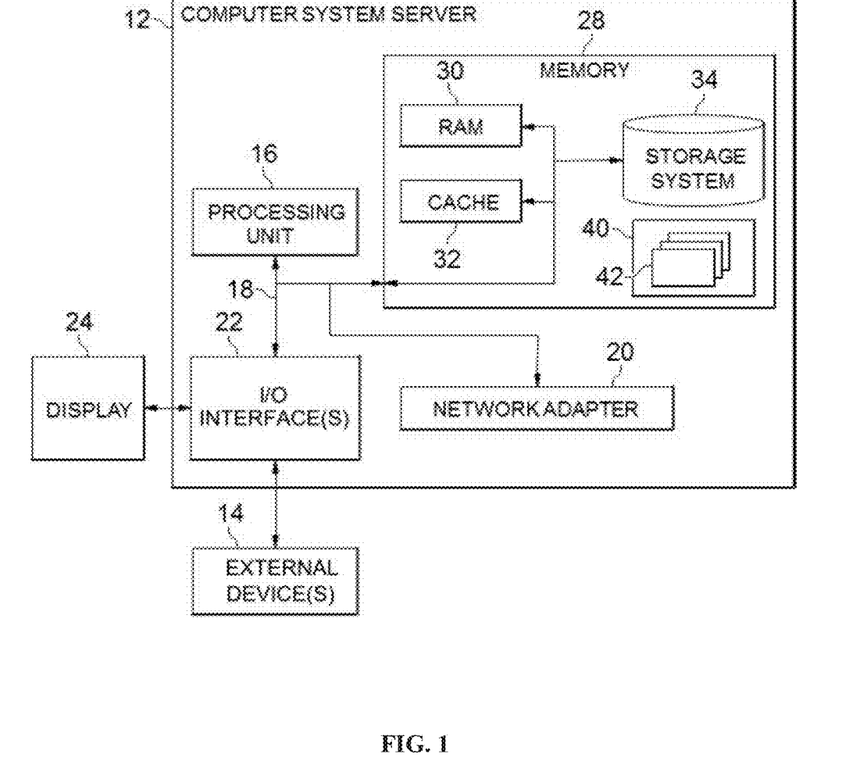
FIG. 1 is a block diagram of an electronic device suitable for implementing embodiments of the present disclosure.

Reference is first made to FIG. 1, in which an exemplary electronic device or computer system/server 12, which is applicable to implement the embodiments of the present disclosure, is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

Figure 2:
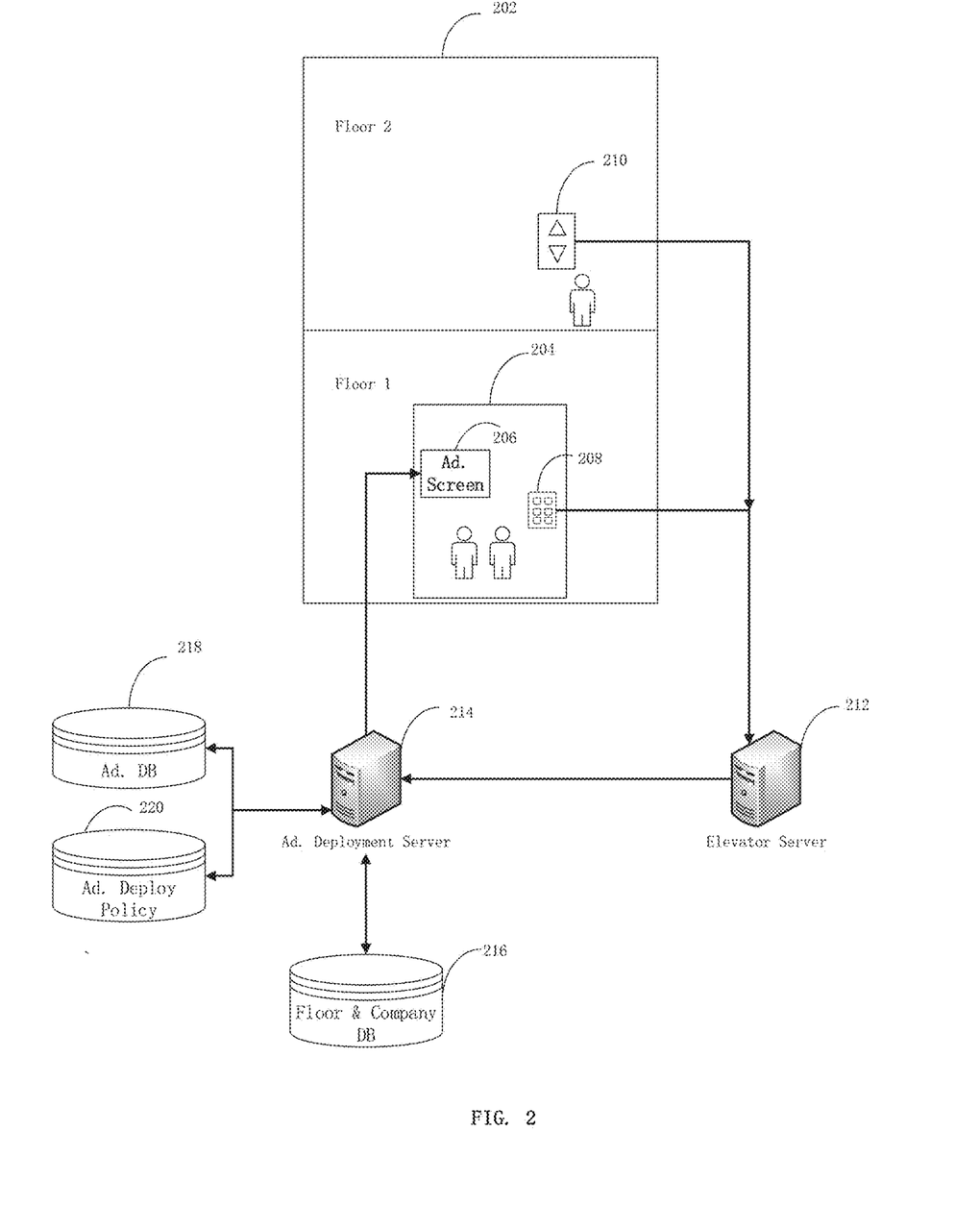
FIG. 2 is a block diagram of an overall system to illustrate the basic idea where embodiments of the present disclosure can be implemented.

Now some example embodiments of the present invention will be described. First, the overall idea of the present disclosure is introduced with reference to an example illustrated in FIG. 2. FIG. 2 is a block diagram of an overall system where embodiments of the present invention may be implemented.

As discussed above, there is a need in the art to enable elevator multimedia display in a more targeted way. Generally speaking, most commercial buildings, like shopping malls and office buildings, tend to arrange business sellers or merchants by floors according to their different types. For example, in a shopping mall, normally all or most of the merchants of women's dresses are arranged in the same floor, and all or most of the food & beverage merchants are arranged in a different floor. Therefore, it is possible to identify characteristics and/or interests of elevator passengers based on the source floor where passengers enter the elevator or the destination floor to where passengers will move, which can be obtained from the input of the elevator buttons inside or outside the elevator. For example, a passenger who presses a button in the elevator to go to the floor where women's dress merchants are will be more likely interested in advertisements for women's dresses or fashion related contents. Similarly, a passenger who enters in the elevator from a floor for children's education will be more likely interested in advertisements for children's education. Based on this information, corresponding advertisements can be displayed in the elevator to better cater to the passengers' needs.

"Multimedia information" mentioned in the present disclosure refers to all types of multimedia information, including but not limited to video plus audio commonly displayed on a screen in an elevator, pure audio that can be broadcasted through a loudspeaker equipped in the elevator, pure video or even static text/pictures.

As shown in FIG. 2, building 202 is a building with two floors, i.e. Floor 1 and Floor 2. Elevator 204 is shown as an exemplary elevator equipped with a screen 206 for displaying information and an inside operation panel 208 with buttons for passengers to press in order to select their target floors. It should be understood that there might be more floors in the building but only two floors are shown in FIG. 2 for the purpose of simplified illustration. Further, there is also shown an outside operation panel 210 with "up" or "down" buttons for a passenger to press. It should be understood that although only outside operation panel 210 is shown on Floor 2, there should be one or more such panels on each floor. The inside operation panels 208 and outside operation panel 210 could communicate with an Elevator Server 212 through Internet, LAN, WIFI or any other types of communication connections, in order to transmit passengers' selections of target floors (through inside operation panel 208) or source floors where the passengers want to enter the elevator (through outside operation panel 210) to the Elevator Server 212. In the present disclosure, this source floor information and target floor information is called "moving status information" of the elevator. The moving status information of the elevator could also comprise other kinds of information and will be introduced later in accordance with other embodiments of the present invention.

Upon receiving the moving status information of the elevator from panel 208 and/or 210, the Elevator Server 212 transfers this information to an Ad. Deployment Server 214, which determined what advertisement(s) should be displayed on the screen 206 within the elevator 204. It should be clear to a person skilled in the art that the name 'Ad. Deployment Server' is just for the purpose of illustration, any other hardware and/or software or the combination thereof could be implemented as long as it can be used to at least implement similar function of the Ad Deployment Server 214. Also, it should be noted that in the present disclosure, advertisement(s) is used as a type of multimedia information, however, it could be any other type of multimedia information. After receiving the moving status information of the elevator, the Ad. Deployment Server 214 queries a Floor & Company DB 216 using the received moving status information to obtain the properties or tags of merchants of the source floor or the target floor. For example, if a passenger presses the button of Floor 3 on the inside operation panel 208, moving status information that including the floor information 'Floor 3' is transmitted to the Ad. Deployment Server 214 which queries the Floor & Company DB 216 to check what types of the companies/merchants are located on Floor 3, and if there is any specific tag corresponding to Floor 3 in the building 202. The companies/merchants' type information and tag of floors described above are previously defined and stored in the Floor & Company DB 216. Suppose the tag of Floor 3 is "children's education", the Ad. Deployment Server 214 will query the Ad. DB 214 for pre-stored advertisements available for display with the type of "children's education". If there are multiple available advertisements in the Ad. DB 218 with the type of "children's education", the Ad. Deploy Policy module 220 will be leveraged to determine which will be displayed, and/or which should be displayed first on the elevator's screen. Finally, the Ad. Deployment Server 214 pushes the determined advertisements for display in the specific order determined by the Ad. Deploy Policy module 220 to the Ad. Screen 206 for display. The methodology of Ad. Deploy Policy for prioritizing the advertisements for display will be further described later.

It should be noted that although it is depicted in FIG. 2 that the Ad. Deployment Server 214 directly sends the determined advertisement(s) or possibly together with the display order information to the Ad. Screen 206 in the elevator 204 for display, it is only for the purpose of illustration. Other implementations could also be utilized. For example, according to another embodiment of the present invention, the determined advertisement(s) can be sent to the Elevator Server 212 by the Ad. Deployment Server 214, then displayed on the Ad Screen 206 in the elevator 204.

In this way, passengers in elevators are able to view advertisements (or other multimedia information) that will most possibly cater their needs.

It should be understood that although Ad. Deployment Server 214 and the Elevator Server 212 are shown as two separate modules in FIG. 2, they can be implemented together as a single physical component as well. Also, according to one embodiment of the present invention, the Ad. Deployment Server 214 could be locally deployed for a specific building 202 and the Ad. DB 218 and the Ad. Deploy Policy module 220 are both locally deployed database to support the multimedia information display solely for the specific building 202. According to another embodiment of the present invention, the Ad. Deployment Server 214 could be deployed to support multimedia information display for various buildings based on remotely deployed Ad. DB 218 and Ad. Deploy Policy module 220. The same situation is for the Elevator Server 212, which can be either deployed locally for a specific building 202 or remotely to receive any moving status information of elevators in multiple buildings. Any specific implementation from network topology perspective shall not restrict the present disclosure.

Figure 3:
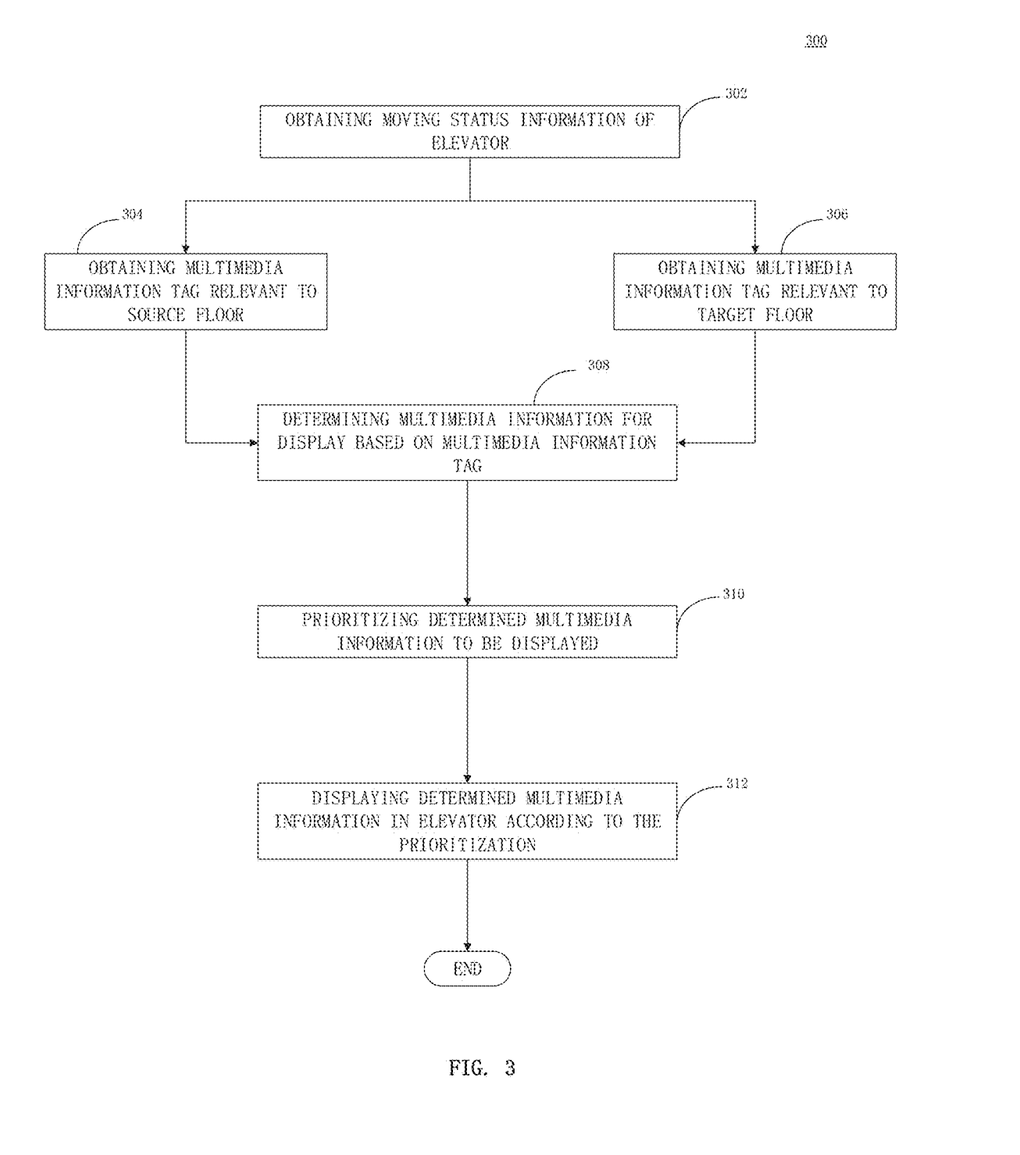
FIG. 3 is a flowchart of a method implemented in accordance with embodiments of the present disclosure.

In the above, an overall system is described where embodiments of the present invention can be implemented. FIG. 3, which is a flowchart of a method in accordance with an embodiment of the present invention, describes the process implemented by the Ad. Deployment Server 214 shown in FIG. 2. However, it should be noted that other parties could also perform the process with appropriate adjustment of the description of steps shown in FIG. 3 without any deviation to the scope of the present disclosure, which is apparent to persons skilled in the art.

As shown in FIG. 3, at Step S302, moving status information of an elevator is obtained. The moving status information comprises at least source floor information and target floor information. The source floor information indicates where a passenger enters the elevator, and the target floor information indicates a destination floor the elevator is moving to. It should be noted that the target floor information is normally input by a passenger through an inside operation panel 208 in the elevator shown in FIG. 2. However, in accordance with another embodiment of the present invention, the target floor information can also be inputted by a passenger through an outside operation panel 210, which is located outside the elevator. In this embodiment, a passenger does not need to input target floor after he/she enters the elevator because there is no inside operation panel in the elevator. It should be understood by a person skilled in the art that once the button is pressed by the passengers, the source floor information and/or the target floor information could be automatically obtained.

The process shown in FIG. 3 moves to Step S304 and/or Step S306. In step S304, a multimedia information tag relevant to the target floor is obtained based on the target floor information included in the moving status information of the elevator. The multimedia information tag indicates a specific type of multimedia information. For example, if the target floor is Floor 2, then in step 304, the multimedia information tag relevant to Floor 2, i.e. "children education", is obtained. The tag "children education" indicates the type of multimedia information for Floor 2. For another example, if the source floor is Floor 3, then in step 306, the multimedia information tag relevant to Floor 3, i.e. "Women's dresses", is obtained. The tag "Women's dresses" indicates the type of multimedia information for Floor 3.

Figure 4:
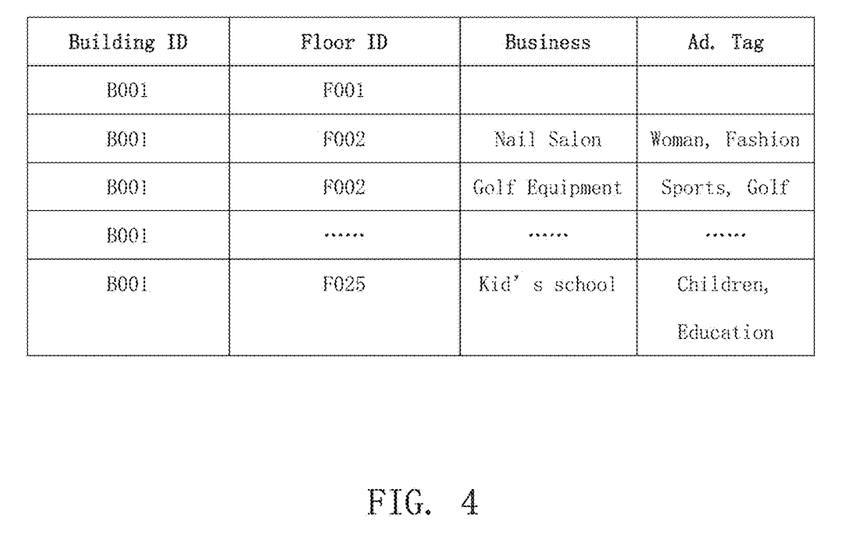
FIG. 4 is an example to illustrate pre-defined multimedia information tag for a building in accordance with embodiments of the present disclosure.

According to an embodiment of the present invention, the multimedia information tag is pre-defined based on a type of resident of at least one floor of a building where the elevator is running. It has been described in the above that same type of merchants or business sellers in a building are normally located in the same floor. FIG. 4 shows an example of pre-defined multimedia information tag for a building. It should be understood by a person skilled in the art that though the multimedia information tag is shown in table format in FIG. 4, there should be no restriction on the specific data structure and/or format used to store the multimedia information tag. For a better understanding, in combination of FIG. 2, the pre-defined multimedia information tag could be stored in the Floor & Company DB 216, and the Ad. Deployment Server 214 could query the Floor & Company DB 216 based on the source floor and/or target floor information received from the Elevator Server 212 for the relevant multimedia tag.

In FIG. 4, fields "Building ID", "Floor ID", "Business" and "Ad Tag" are shown. Building ID could be used to differentiate different buildings if the Floor & Company DB 216 shown in FIG. 2 is used for various buildings. While different types of business and corresponding Ad Tag could be assigned for the same floor in the same building, for example, the Floor ID F002 covering both businesses of nail salon and golf equipment will have different Ad Tags respectively. According to one embodiment of the present invention, different tags for the same floor could all be obtained in Step S304 and S306 for further processing. According to yet another embodiment of the present invention, only one tag for the same floor will be selected for further processing based on the priority of the merchant resident in the floor with the Floor ID F002.

It should be emphasized that the multimedia information tag is not mandatory for determination of the multimedia information to be displayed. According to another embodiment of the present invention, each floor of a building is directly bonded to a company's name so that once the source floor or target floor information is obtained, the company's name corresponding to that specific floor can be directly obtained, and thus the company's advertisement(s) could be directly determined as the multimedia information to be displayed, without checking the tag and the type of the multimedia information to be displayed.

Now explanation is given on the conditions of using source floor or target floor to determine the multimedia information to be displayed. Though the source floor information and target floor information could be both obtained, probably only one type of information is used to determine the to-be-displayed multimedia information. For example, for passengers who enter the elevator from Floor 1 (or Floor Ground) in a shopping mall where there is no basement floor with companies/merchants, the source floor information has not much meaning for determination of the to-be-displayed multimedia information because all customers, no matter which floor they want to go to, will enter the elevator from Floor 1 (or Floor Ground). In this example, the system probably only needs to use the target floor information of the passengers to decide what multimedia information should be displayed. In another example, when the elevator is moving in the downwards direction with Floor 1 (or Floor Ground) as the only target floor, the target floor information has not much meaning because most passengers moving in the downwards direction will go to Floor 1 (or Floor Ground) and leave the building. In this example, the system probably only needs to use the source floor of the passengers to decide what multimedia information should be displayed. In all, it should be understood by a person skilled in the art that flexible rules can be applied to determine whether or not to use source floor information, target floor information, or both, to determine the to-be-displayed multimedia information in accordance with different situations of different buildings, without deviating from the idea of the present disclosure.

Figure 5:
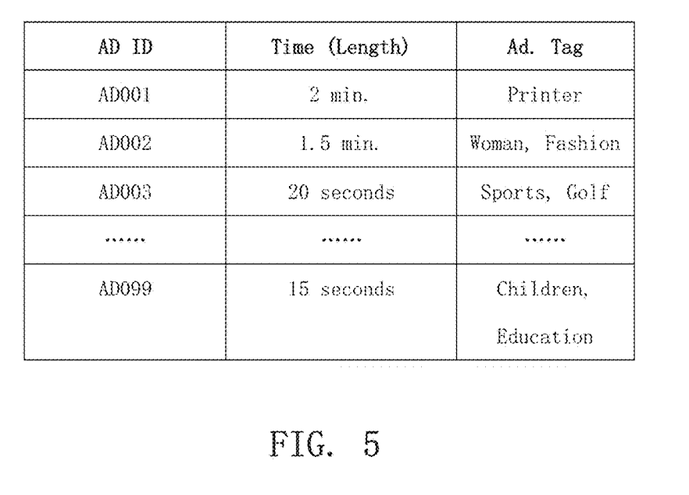
FIG. 5 is an example to illustrate the data pre-stored in a multimedia information database in accordance with embodiments of the present disclosure.

At Step S308, multimedia information with the same type as indicated by the multimedia information tags is determined as the multimedia information to be displayed. For example, if the multimedia information tag relevant to Floor 2 is "children education", the Ad. Deployment Server 214 could use the tag "children education" to search in the Ad. DB 218 for any advertisements pre-stored in Ad. DB 218 with the same type as "children education". In the Ad. DB 218, the contents (e.g., video, audio, texts and/or pictures) of advertisements and type of the advertisement(s) are both stored so that the advertisements may be matched by type. FIG. 5 shows an example of the data pre-stored in the Ad. DB 218 of FIG. 2. In FIG. 5, fields "AD ID", "Time (length) of the Ad" and "Ad. Tag" are shown in the table. In combination with FIG. 4, if the obtained tag in Step S304 or S306 is "Woman, Fashion", then the Ad. Deployment Server 214 could use the tag to determine the corresponding advertisement(s) as AD002 with a length of 1.5 minutes. FIG. 5 is also for the purpose of illustration, without exerting any restrictions on the data structure and/or format of Ad. DB 218.

It also needs to be emphasized that though Ad. Tag is used in FIG. 4 as an example of multimedia information tag, it should be understood by a person skilled in the art that the invention can also be applied with any other types of multimedia information, e.g., non-commercial announcements or public notices, etc. For example, in a students' dormitory, different public notices are prepared for students from different majors/departments in a university. Considering students from the same major/department often live in the same floor, different public notices could be displayed in the elevator to corresponding students according to the source floor information or the target floor information.

In accordance with another embodiment of the present invention, multimedia information tags could be implemented as some key words, such as companies' names. For example, some companies cover broad industries rather than focus in one particular product/service line. So if the multimedia information tag is pre-defined as the names of the companies, the Ad. Deployment Server 214 could query the Ad. DB 218 for the same company's name to determine the to-be-displayed advertisement(s). The determined advertisement(s) may deviate from the "type" feature of the particular floor in the building, but belongs to the same company.

According to an embodiment under the present disclosure, once the multimedia information to-be-displayed is determined in Step S308, it will be displayed on the screen in the elevator. For example, if only one piece of multimedia information is determined, the determined multimedia information will be displayed accordingly.

However, according to another embodiment of the present invention, if multiple pieces of multimedia information are determined in Step S308, the determined pieces of multimedia information will be prioritized to determine which piece should be displayed and which should not, and/or the display order. In this embodiment, the process shown in FIG. 3 moves to Step S310, in which the determined multimedia information to be displayed is prioritized.

Before getting into the specific embodiments about prioritization, some other embodiments regarding the contents of moving status information obtained in Step S302 will be first introduced because the additional contents of moving status information will probably be used in some embodiments about prioritization in Step 310.

According to embodiments of the present invention, the moving status information of the elevator further comprises at least one of the following: current floor where the moving elevator is, the moving direction of the elevator, and quantity of passengers entering the elevator in the source floor. Usage of these additional (but not mandatory) contents in moving status information is introduced in the next paragraph.

For example, the elevator is now moving in the upwards direction and the current floor is Floor 5. The target floors comprise Floor 4 and Floor 13. Now it is better to first display the multimedia information corresponding to Floor 13 rather than Floor 4 because, in this case, the elevator will first arrive at Floor 13. So, the current floor information and moving direction information are used to better determine the to-be-displayed multimedia information.

For another example, a passenger enters the elevator from Floor 8, and then ten passengers enter the elevator from Floor 6. In this case, it is probably better to first display the multimedia information determined according to Floor 6. In order to enable detection of the quantity of passengers entering the elevator on a source floor, weighing sensors or load cells may be attached to the elevator and the quantity of passengers could be anticipated based on the increase of weight and average weight of a single person. The technology of weighing sensor or load cells used in elevator is a mature technology and various existing products or solutions could be adopted for incorporation of weighing sensors or load cells into an elevator. The details will not be further introduced here.

Prioritization will be described with respect to Step S310. Various prioritization rules could be used separately or in combination with each other according to various embodiments of the present invention. According to an embodiment of the present invention, the multimedia information could be prioritized in accordance with the arrival sequence of multiple target floors. For example, buttons of Floor 5 and Floor 7 in the inside operation panel in the elevator have been both pressed down and the elevator is now at Floor 2 and with an upwards moving direction. The multimedia information corresponding to Floor 5 may be first displayed and then the multimedia information corresponding to Floor 7 will be displayed. According to another embodiment of the present invention, the multimedia information is prioritized in accordance with the quantity of passengers entering the elevator at multiple source floors, as described above. According to yet another embodiment of the present invention, the multimedia information is prioritized based on a determination of the length of which piece of multimedia information will match the time needed for the elevator to arrive at a specific target floor. For example, the elevator is now at Floor 8 and the target floors are Floor 10 and Floor 11. One piece of multimedia information is determined corresponding to Floor 10 and one piece of multimedia information is determined corresponding to Floor 11. The length of the piece of multimedia information corresponding to Floor 10 is 20 seconds, while the length of the piece of multimedia information corresponding to Floor 11 is only 10 seconds. The time for the elevator to move from Floor 8 to Floor 10 is 5 seconds, and a further 5 seconds to move from Floor 10 to Floor 11. In this case, it is better to display the piece of multimedia information determined according to Floor 11 directly and neglect the multimedia information determined corresponding to Floor 10 because it cannot be fully displayed. It should be understood by a person skilled in the art that the rules for prioritization described above are only for the purpose of illustration and should not put restrictions on the scope of the invention. Various prioritization rules could be used in accordance with different types of buildings or specific technology or business needs, without deviated from the spirit of the present disclosure.

At Step S312, the determined multimedia information is displayed in the elevator in accordance with the prioritization implemented in Step S310. It should be noted by a person skilled in the art that although according to one embodiment of the present invention, the Ad. Deployment Server 214 directly communicates with the elevator's display device to display the determined and/or prioritized multimedia information, according to another embodiment of the present invention, the Ad. Deployment Server 214 could communicate with the Elevator Server 212 shown in FIG. 2 or elevator manager/operator (not shown) to notify the determined/prioritized multimedia information, and then the Elevator Server 212 or elevator manager/operator will transmit the to-be-displayed multimedia information to the elevator's display screen for display. In both of the above mentioned embodiments, it could be understood that the system/device that performs Steps S302-S310 also performs Step S312 of displaying as the previous steps do at least trigger the display action.

As described above, the present disclosure enables precise and targeted multimedia information display according to an audience interest list that is generated according to the data of real-time elevator orientation and destination floors.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method for multimedia information display in an elevator, the method comprising:
   obtaining a moving status information of the elevator, the moving status information comprising at least source floor information where each passenger of a quantity of passengers enter the elevator and target floor information for each target floor where the elevator is moving to;
   determining multimedia information to be displayed based on the moving status information of the elevator;
   prioritizing the determined multimedia information to be displayed in accordance with the quantity of passengers entering in the elevator at each source floor of a multiplicity of source floors; and
   displaying the determined multimedia information in the elevator in accordance with the prioritizing.

2. The method of claim 1, wherein determining the multimedia information to be displayed based on the moving status information of the elevator comprises:
   obtaining a plurality of multimedia information tags relevant to each target floor based on the target floor information, each multimedia information tag indicating a specific type of multimedia information; and
   determining multimedia information with a same type as indicated by the multimedia information tag as the multimedia information to be displayed.

3. The method of claim 2, wherein the multimedia information tag is pre-defined based on a type of resident in at least one floor of a building where the elevator is running.

4. The method of claim 1, wherein determining the multimedia information to be displayed based on the moving status information of the elevator comprises:
   obtaining a plurality of multimedia information tags relevant to each source floor based on the source floor information, each multimedia information tag indicating a specific type of a multimedia information; and
   determining multimedia information with a same type as indicated by the multimedia information tag as the multimedia information to be displayed.

5. The method of claim 4, wherein the multimedia information tag is pre-defined based on a type of resident in at least one floor of a building where the elevator is running.

6. The method of claim 1, wherein the moving status information of the elevator further comprises at least one of the following:

a current floor where the moving elevator is, a moving direction of the elevator and a quantity of passengers entering the elevator on each source floor.

7. The method of claim 1, wherein the prioritizing is further based on at least one of the following rules of prioritization:
prioritizing multimedia information in accordance with arrival sequence of multiple target floors; and
prioritizing multimedia information with a matched length as a time needed for the elevator to arrive at a specific target floor.

8. The method of claim 1, wherein prioritizing the determined multimedia information to be displayed in accordance with the quantity of passengers entering in the elevator at multiple source floors comprises:
prioritizing the determined multimedia information to be displayed according to source floor information associated with a greatest quantity of passengers entering the elevator from a corresponding source floor.

9. A computer system for multimedia information display in an elevator, comprising:
one or more processors;
a memory coupled to at least one of the processors;
a set of computer program instructions stored in the memory and executed by at least one of the processors in order to perform actions of:
obtaining a moving status information of the elevator, the moving status information comprising at least source floor information where each passenger of a quantity of passengers enter the elevator and target floor information for each target floor where the elevator is moving to;
determining multimedia information to be displayed based on the moving status information of the elevator;
prioritizing the determined multimedia information to be displayed in accordance with the quantity of passengers entering in the elevator at each source floor of a multiplicity of source floors; and
displaying the determined multimedia information in the elevator in accordance with the prioritizing.

10. The computer system of claim 9, wherein the set of computer program instructions is executed by at least one of the processors in order to determine multimedia information to be displayed based on the moving status information of the elevator by:
obtaining a plurality of multimedia information tags relevant to each target floor based on the target floor information, each multimedia information tag indicating a specific type of multimedia information; and
determining multimedia information with a same type as indicated by the multimedia information tag as the multimedia information to be displayed.

11. The computer system of claim 9, wherein the set of computer program instructions is executed by at least one of the processors in order to determine multimedia information to be displayed based on the moving status information of the elevator by:
obtaining a plurality of multimedia information tags relevant to each source floor based on the source floor information, each multimedia information tag indicating a specific type of a multimedia information; and
determining multimedia information with a same type as indicated by the multimedia information tag as the multimedia information to be displayed.

12. The computer system of claim 9, wherein the moving status information of the elevator further comprises at least one of the following:
a current floor where the moving elevator is, a moving direction of the elevator and a quantity of passengers entering the elevator on each source floor.

13. The computer system of claim 9, wherein the prioritizing is further based on at least one of the following rules of prioritization:
prioritizing multimedia information in accordance with arrival sequence of multiple target floors; and
prioritizing multimedia information with a matched length as a time needed for the elevator to arrive at a specific target floor.

14. The computer system of claim 9, wherein prioritizing the determined multimedia information to be displayed in accordance with the quantity of passengers entering in the elevator at multiple source floors comprises:
prioritizing the determined multimedia information to be displayed according to source floor information associated with a greatest quantity of passengers entering the elevator from a corresponding source floor.

15. A computer program product for multimedia information display in an elevator, comprising a non-transitory computer readable storage medium, wherein program instructions are stored on the non-transitory computer readable storage medium, the program instructions capable of being executed by at least one processor, to cause the at least one processor to perform a method comprising:
obtaining a moving status information of the elevator, the moving status information comprising at least source floor information where each passenger of a quantity of passengers enter the elevator and target floor information for each target floor where the elevator is moving to;
determining multimedia information to be displayed based on the moving status information of the elevator;
prioritizing the determined multimedia information to be displayed in accordance with the quantity of passengers entering in the elevator at each source floor of a multiplicity of source floors; and
displaying the determined multimedia information in the elevator in accordance with the prioritizing.

16. The computer program product of claim 15, wherein determining the multimedia information to be displayed based on the moving status information of the elevator comprises:
obtaining a plurality of multimedia information tags relevant to each target floor based on the target floor information, each multimedia information tag indicating a specific type of multimedia information; and
determining multimedia information with a same type as indicated by the multimedia information tag as the multimedia information to be displayed.

17. The computer program product of claim 15, wherein determining the multimedia information to be displayed based on the moving status information of the elevator comprises:
obtaining a plurality of multimedia information tags relevant to each source floor based on the source floor information, each multimedia information tag indicating a specific type of a multimedia information; and
determining multimedia information with a same type as indicated by the multimedia information tag as the multimedia information to be displayed.

18. The computer program product of claim 15, wherein the moving status information of the elevator further comprises at least one of the following:

a current floor where the moving elevator is, a moving direction of the elevator and a quantity of passengers entering the elevator on each source floor.

19. The computer program product of claim 15, wherein the prioritizing is further based on at least one of the following rules of prioritization:
   prioritizing multimedia information in accordance with arrival sequence of multiple target floors; and
   prioritizing multimedia information with a matched length as a time needed for the elevator to arrive at a specific target floor.

20. The computer program product of claim 15, wherein prioritizing the determined multimedia information to be displayed in accordance with the quantity of passengers entering in the elevator at multiple source floors comprises:
   prioritizing the determined multimedia information to be displayed according to source floor information associated with a greatest quantity of passengers entering the elevator from a corresponding source floor.

* * * * *